United States Patent Office 3,526,834
Patented Sept. 1, 1970

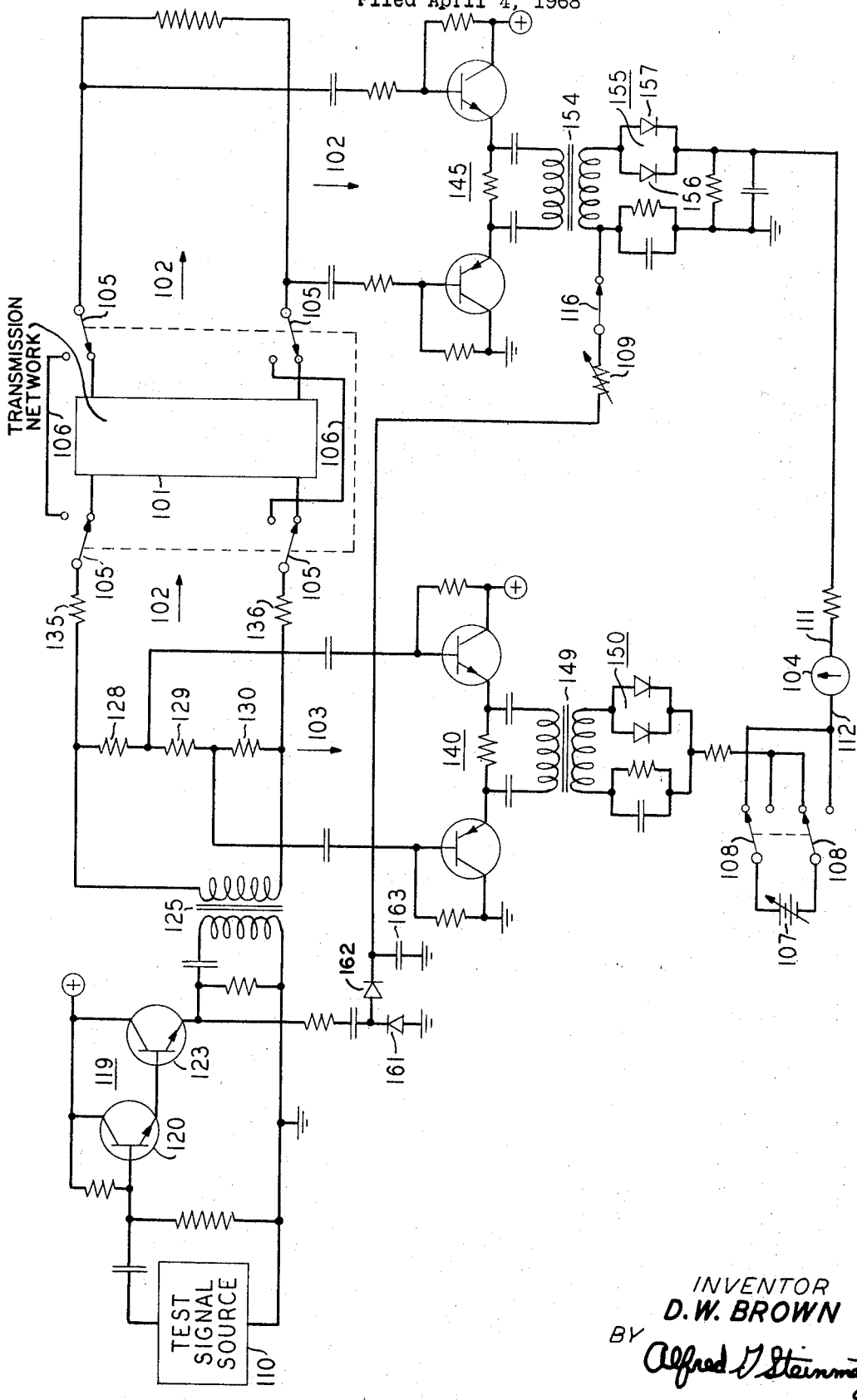

3,526,834
IMPEDANCE LOSS METER MEASURING VOLTAGE DIFFERENCES INDEPENDENTLY OF SIGNAL SOURCE ERROR BY COMPARING TEST AND REFERENCE VOLTAGES DERIVED FROM A COMMON SOURCE
Donald W. Brown, Glen Ellyn, Ill., assignor to Bell Telephone Laboratories, Incorporated, Murray Hill and Berkeley Heights, N.J., a corporation of New York
Filed Apr. 4, 1968, Ser. No. 718,675
Int. Cl. G01n 7/00, 27/00
U.S. Cl. 324—57                                       7 Claims

ABSTRACT OF THE DISCLOSURE

An insertion loss meter to measure the insertion losses of a low loss network measures the difference in the transmitted test voltages prior and subsequent to the insertion of the network. The test voltages are compared to a reference voltage derived from the same signal source as the test voltage. A voltage component derived from the test signal source is added to the test signal to null the reference voltage. This measurement technique eliminates the need for a precisely stable test signal source since the test measurements are not adversely affected by fluctuations of the test signal source.

FIELD OF THE INVENTION

This invention relates to an insertion loss measurement apparatus and, more particularly, to an insertion loss measurement apparatus to accurately measure insertion losses of small magnitude.

BACKGROUND OF THE INVENTION

The insertion loss of a network is the ratio of the power transmitted in a transmission system before and after the insertion of the network into the transmission path. The insertion loss measurement of a network is performed by measuring the magnitude of voltage transmitted to a point subsequent to the point of insertion, both before and after the network is inserted into the system. The insertion loss is usually expressed in terms of decibels which are defined by the logarithm of the ratio of the squares of these voltages.

The accuracy of the insertion loss measurement is dependent upon the stability of the test signal source since any fluctuations therein will be included in the measured voltages. This stability is particularly critical in instances where the insertion loss of the network is small, and the difference between the two measured voltages is minimal. Hence, it is generally necessary to utilize a very stable and precise test signal source in measuring small insertion losses.

It is therefore an object of the invention to accurately measure a small insertion loss of a network without the necessity of using a precisely stable test signal source.

It is another object of the invention to measure the insertion loss of a network by measuring a difference voltage between the successive transmitted voltages which is unaffected by fluctuations of the test signal source.

SUMMARY OF THE INVENTION

Therefore, in accordance with the present invention, an insertion loss is measured independently of fluctuations in the voltages of the test signal source, by measuring a difference in the voltage level which is responsive to the insertion of the network under test and immunized from the aforesaid fluctuations.

The insertion loss measuring apparatus comprises a test signal source and a null indicating meter. A reference transmission path interconnects the test signal source and one input of the null indicating meter. A test transmission path interconnects the test signal source and the other input of the null indicating meter. The test transmission path includes the network to be tested and a switching means to bypass the network.

An initial calibration adjustment is made to balance the null meter by adding an auxiliary signal to one of its inputs. This calibration adjustment is made with the network in the test path bypassed and is utilized to compensate for the differences in signal transmission of the test and reference paths. The network to be tested is inserted into the test path, and the null meter is again balanced by adding an additional signal component to the test signal voltage level transmitted by the network. The additional signal component added to achieve the second null balance is utilized to determine the insertion loss characteristic of the network.

A feature of the invention is the utilization of the test signal source to supply the additional signal component utilized to adjust the second null balance. The utilization of the test signal source as the source of this added signal component eliminates the effects of the fluctuations of the test signal voltage on the measurement of the insertion loss.

Another feature of the invention is the utilization of the aforementioned additional signal component to maintain a substantially fixed operating signal level in portions of the test apparatus to minimize signal distortions due to nonlinearities therein.

DRAWING

These and other objects of the present invention and its various advantages will appear more fully upon consideration of the attached drawing and the following detailed description thereof, wherein:

The sole figure is a circuit schematic of an insertion loss test measurement apparatus according to the principles of the present invention.

DETAILED DESCRIPTION

The insertion loss measurement apparatus shown in the drawing is utilized to measure the insertion loss of a network 101. The network 101 may comprise any switching or transmisison network whose insertion loss characteristics are to be measured. The insertion loss of the network 101 is determined by measuring the voltage difference in the transmitted test signal due to the insertion of the network 101 into the transmission path 102.

A calibrated test signal source 110, which may comprise any suitable alternating current signal generator, generates an alternating current signal. This alternating current signal is applied, via a test transmission path 102, to the network 101 and from thence to the test input 111 of a null meter 104. This alternating current signal is also applied, via a reference transmission path 103, to the reference input 112 of the null meter 104.

The alternating current signals transmitted by the test and reference paths 102 and 103 are rectified by the rectifiers 155 and 150 before application to the null meter 104. This rectification eliminates the effects of any phase differences introduced into the test signals by the test and reference paths 102 and 103. An auxiliary adjustable direct current voltage source 107, which may be an integral part of the null meter 104, is coupled to the reference input 112. The polarity reversal switches 108 permit either a positive or a negative polarity to be selected as is needed to achieve a null balance in the null meter 104.

Initially, a calibration null balance is adjusted in the null meter 104 by adjusting the voltage level applied to the reference input 112. This votage level is adjusted by adjusting the voltage output of the auxiliary adjustable source 107. For the purpose of this calibration adjustment, the network 101 is removed from the test transmission path 102 and bypassed by the auxiliary transmission path 106.

The connections of the test path 102 to the network 101 and the auxiliary path 106 are controlled by the gang switch 105 which has four armatures and is shown in the drawing in its normally closed position. When the armatures of the switch 105 are in the open position, the network 101 is bypassed by the auxiliary path 106. The design of such a switching arrangement and its control is believed to be readily apparent to those skilled in the art and hence need not be discussed in detail.

For the purposes of the calibration adjustment, the switch 116 shown in the drawing in its normally closed position is open to prevent the addition of added signal components to the test path 102. This initial calibration null adjustment of the null meter 104 equalizes the null meter 104 so that the differences in signal transmission between the test transmission path 102 and the reference transmission path 103 are not reflected in the subsequent null adjustments.

The network 101 to be tested for its insertion loss characteristics is inserted into the transmission test path 102 by closing the armatures of the gang switch 105. The switch 116 is closed to permit the addition of an added signal component to the test path 102, as is described below. The rectified voltage of the test signal transmitted by the test transmission path 102 and the network 101 is applied to the test input 111 of the null meter 104. The rectified voltage of the test signal transmitted by the reference transmission path 103 is applied, via the auxiliary source 107, to the reference input 112 of the null meter 104. The null meter 104 is again balanced to achieve a null adjustment by adding a direct current added signal component to the test signal level in the rectifier 155 subsequent to the inserted network 101. The magnitude of this direct current signal component is utilized to determine the insertion loss of the network 101 in accordance with the following relation:

$$\text{Insertion loss} = 20 \text{ LOG} \left(1 - \frac{\Delta V}{V}\right) \quad (1)$$

where $\Delta V$ = the magnitude of the voltage of the added direct current signal component; and $V$ = the magnitude of the voltage transmitted by the test path 102 before insertion of the network 101.

This added direct current signal component is directly supplied by the test signal source 110, and hence any fluctuations in the generated test signal are equalized by related fluctuations in the direct current added signal component. The magnitude of this added signal component is controlled by an adjustable impedance 109. The adjustable impedance 109 may suitably comprise a potentiometer, a decade resistance, or other variable impedance arrangement having a calibrated adjustment. The calibrated readings of a particular setting to adjust a null is translated into a voltage difference $\Delta V$ which is used to determine the insertion loss, as indicated above.

The test signal source 110 may comprise a sinusoidal oscillator or any suitable alternating current signal generator. The test signal source 110 is coupled to the test and reference transmission paths 102 and 103 by a transistor amplifier 119 and a coupling transformer 125. The amplifier 119 comprises the two transistors 120 and 123 which are connected in a Darlington type configuration. The Darlington configuration, as is well known in the art, has a high input impedance and a low output impedance. The amplifier 119, hence, isolates the test signal source 110 from the test and reference transmission paths 102 and 103 and converts it into a low impedance test signal source for the purpose of energizing the two transmission paths 102 and 103.

The signal output of the amplifier 119 is applied simultaneously via the coupling transformer 125 to both the test and reference transmission paths 102 and 103. The test transmission path 102 is preferably balanced with respect to ground. A voltage divider, comprising the resistors 128, 129, and 130, is connected across the secondary of the coupling transformer 125. The two input terminals of the reference transmission path 103 are connected to the junction of resistors 128–129 and 129–130, respectively. The respective values of the resistors 128, 129, and 130 are selected to attenuate the test signal voltage by the same amount of attenuation introduced into the test signal by the impedances 135 and 136 of the test transmission path 102. The impedances 135 and 136 are selected to provide the correct source impedance for the network 101. This selected attenuation advantageously limits the voltage level needed to make the calibration null adjustment.

The test and reference paths 102 and 103 are isolated from the null meter 104 by the amplifiers 145 and 140, respectively. The amplifiers 140 and 145 each comprise two transistors, each of which is connected in an emitter follower configuration. The high input impedance of the amplifiers 140 and 145 reduces the loading effect of the rectifiers 150 and 155 and the null meter 104 on the test signal source 110 and the network 101 to a minimum. The low output impedance of the amplifiers 140 and 145 advantageously permits a low loss transmission of the test signal voltage, via the coupling transformers 149 and 154, to the half-wave rectifiers 150 and 155. Hence the peak output voltage of the rectifiers 150 and 155 will approximately equal the peak value of the test signal input and hence the test signal resolution is not significantly impaired.

The rectification of the test signal by the rectifiers 155 and 150, as described above, advantageously eliminates phase shift differences introduced into the test signal by the test and reference paths 102 and 103.

The test signal output of the test signal source 110 is utilized as the added signal component to adjust the second null balance to measure the insertion loss of the network 101. This test signal is applied, via a full-wave rectifier, comprising the diodes 161 and 162 and a smoothing capacitor 163, to the adjustable impedance 109. The adjustable impedance 109 is connected to the rectifier 155, via the secondary of the coupling transformer 154. The adjustable impedance 109 controls the voltage level of the rectified test signal injected into the rectifier 155, and is preferably calibrated so that this voltage level of the added signal component may be readily determined. This added signal component is utilized to adjust the second null balance achieved in the null meter 104, as described hereinabove.

It is particularly advantageous to directly inject this added signal component into the rectifier 155 to null the meter 104. Its insertion at this particular point in the test path 102 maintains the diodes 156 and 157 at a constant operating level. Hence no nonlinearities are introduced into the test signal due to the nonlinear signal transmission characteristics of the diodes 156 and 157.

The reference input 112 of the null meter 104 is connected to the adjustable auxiliary source 107. This auxiliary source 107 is used to initially balance the null meter 104 to compensate for transmission path differences during the initial calibration operation as described hereinabove. The gang switch 108 shown in its normally closed position permits a reversal in polarity in the calibration adjustment voltage applied to the reference input 112. Since only voltage differences are determined by the subsequent null balance adjustment, the null meter 104 need not be balanced with respect to ground.

The accuracy of the insertion loss measurement is determined by the magnitude of the test signal voltage, the accuracy and range of the adjustable impedance calibration and the existing noise conditions in the test and reference transmission paths 102 and 103. These parameters may be readily determined by measuring the insertion loss of a highly accurate standard network of known insertion loss.

It will be readily apparent to those skilled in the art that a large range of insertion loss measurements may be made with the proper selection of test signal voltages and the range of the adjustable impedance 109.

What is claimed is:

1. Apparatus to measure the insertion loss of a network comprising in combination, a test path including first switching means for selectively inserting into said test path said network to be tested, a reference path, a test signal source, a null indicating meter, said test path and said reference path each interposed between said test signal source and said null indicating meter, an auxiliary adjustable signal source means connected in said reference path to provide a signal to adjust a null balance in said null indicating meter and said signal addition means to add a signal component to said test path to adjust a null balance in said null indicating meter, said signal addition means including second switching means to couple said signal addition means to said test path and means to derive said signal component from the signal output of said test signal source whereby a first null indication in said null indicating meter is preadjusted with said auxiliary adjustable signal source before said network is inserted in said test path and a second null indication in said null indicating meter is adjusted after said network is inserted by said first switching means in said test path by adding said signal component to said test path by coupling said signal addition means to said test path by said second switching means.

2. The combination claimed in claim 1 further including a voltage divider coupling said test signal source to said test path and said reference path to equalize the test signal attenuation in said reference path with the test signal attenuation in said test path.

3. The combination claimed in claim 2 further including a first signal rectifier means in said test path and a second signal rectifier means in said reference path whereby said first and second rectifier means comprise asymmetric conducting devices.

4. The combination claimed in claim 3 wherein said means to derive compromises a third signal rectification means and means to control the amplitude of said signal component, whereby said signal component is injected into said first signal rectification means.

5. Test apparatus to measure the insertion loss of a network comprising a test signal source, a null indicating meter to compare two signal inputs, first transmission path means to connect said test signal source to one input of said null indicating meter, said first transmission path means including a first means to rectify the signal output of said signal source, and said first transmision path means further including an auxiliary null adjustment means, second transmission path means to connect said test signal source to another input of said null indicating meter, said second transmission path means including switching means to selectively include or exclude therein the network to be tested, said second transmission path means further including second means to rectify the test signal ouput of said signal source and a D.C. voltage source including means to inject the D.C. voltage into said second means to rectify, whereby a null indication in said null indicating meter is preadjusted with said auxiliary null adjustment means when said network is excluded from said second transmission path and a subsequent superimposed null indication is obtained in said null indicating meter when said network is included in said second transmission path by adjusting the D.C. voltage level in said second means to rectify.

6. The test apparatus claimed in claim 5 wherein said D.C. voltage source comprises means to derive a D.C. voltage from the signal output of said test signal source and said means to inject the D.C. voltage includes a calibrated impedance means to adjust the amplitude of said derived D.C. voltage.

7. The test apparatus claimed in claim 6 further including a voltage divider interconnecting said signal source and said first transmission path means to attenuate the test signal output of said signal source to approximately equalize the signal transmission in said first transmission path with the signal transmission in said second transmission path.

References Cited
UNITED STATES PATENTS 2,618,686    11/1952    De Lange    324—57
3,210,656    10/1965    Lent    324—57

EDWARD E. KUBASIEWICZ, Primary Examiner

U.S. Cl. X.R.

324—140